C. R. & O. O. KELLER.
BEAN HARVESTER.
APPLICATION FILED AUG. 15, 1911.
1,053,298.
Patented Feb. 18, 1913.
3 SHEETS—SHEET 3.
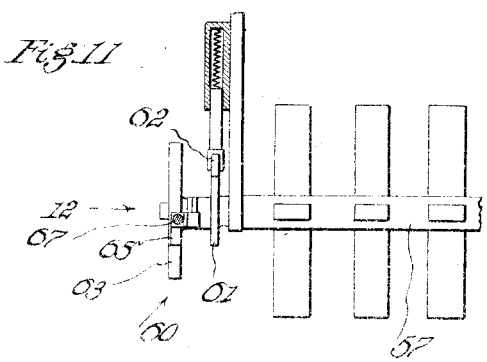
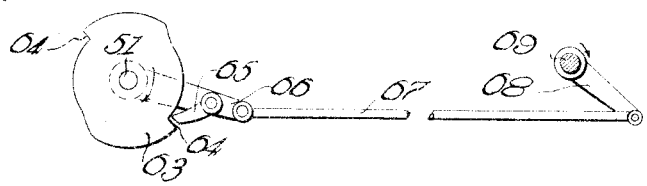
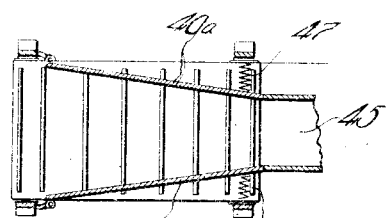
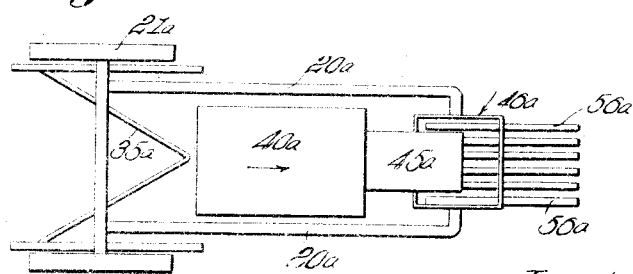
Witnesses
Inventors
Charles R. Keller and Otto O. Keller,
by James T. Barkeller
their Attorney.

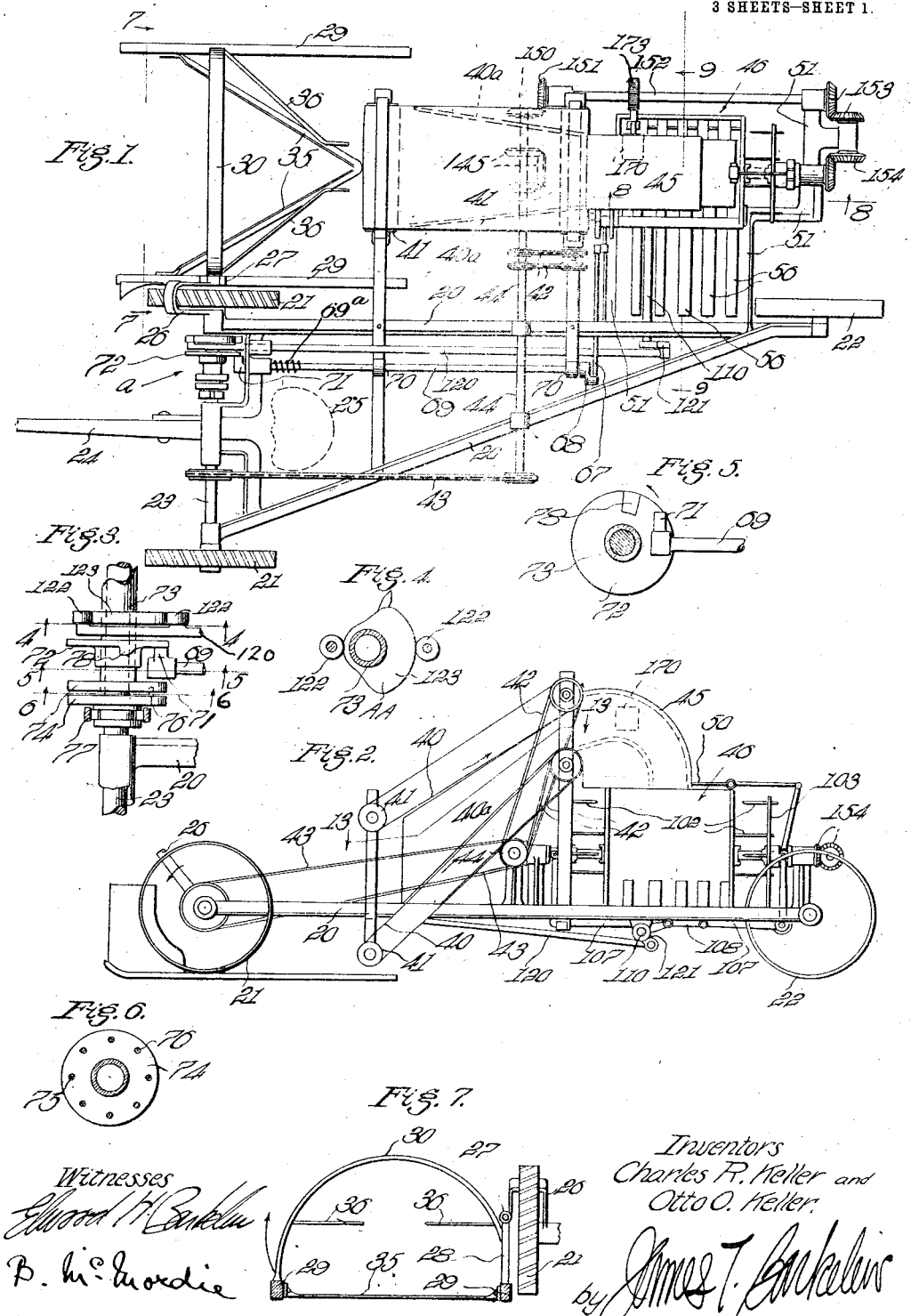

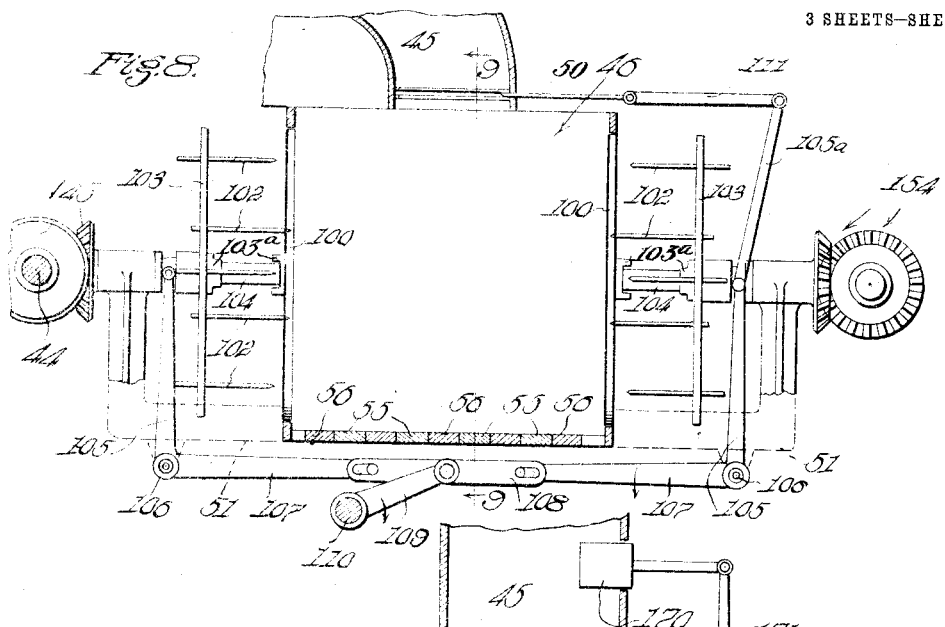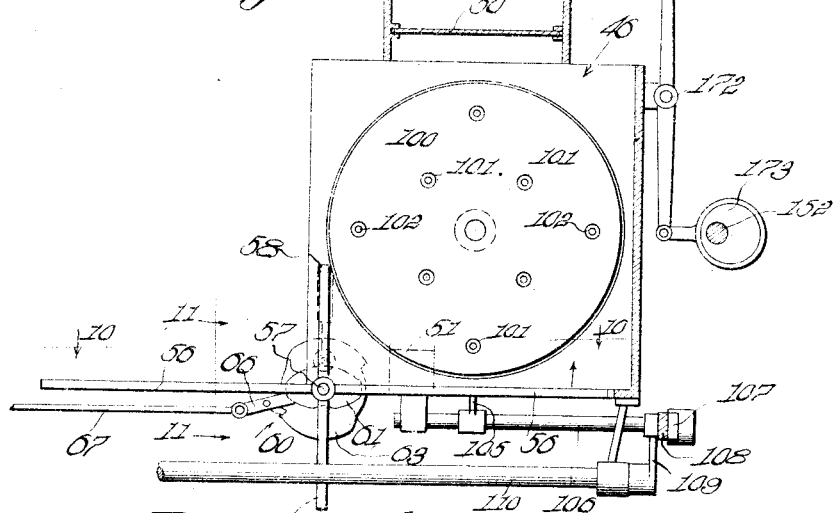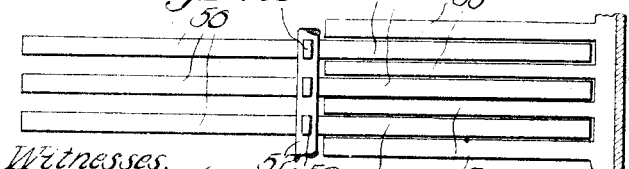

UNITED STATES PATENT OFFICE.

CHARLES R. KELLER, OF OXNARD, AND OTTO O. KELLER, OF SANTA PAULA, CALIFORNIA.

BEAN-HARVESTER.

1,053,298.   Specification of Letters Patent.   Patented Feb. 18, 1913.

Application filed August 15, 1911. Serial No. 644,194.

*To all whom it may concern:*

Be it known that we, CHARLES R. KELLER and OTTO O. KELLER, citizens of the United States, residing at Oxnard and Santa Paula, respectively, both in the county of Ventura, State of California, have invented new and useful Improvements in Bean-Harvesters, of which the following is a specification.

This invention relates to a machine for harvesting beans, such as Lima beans and the like, and for so handling and operating upon them that they are left in an improved condition on the field ready for drying and subsequent threshing.

In the ordinary harvesting and handling of Lima beans, a device known as a harvester is used to merely cut down the bean vine, allowing them to remain on the ground scattered along the rows from which they are cut. The beans are thus left for a short time to be dried out in the sun; the threshing machine then takes them and separates the beans from the vine and leaves, packing the beans ready for shipment. There are several difficulties with this mode of operation and prime among them are these: that the beans are gathered with some difficulty when they are left scattered about the field; and that, should rainfall occur, the beans are liable to become wet and must be redried, causing a loss of a large proportion of the crop.

One of the fundamentals of our invention is the winding of the bean vines into bundles which are thrown out of our harvester and left along the ground at regular intervals. By actual test we have shown that beans so wound into a bundle do not become soaked with moisture in case of rainfall; and the bundles are much more easily handled when it is necessary to gather the beans from the ground and to transport them to the thresher.

Accomplishing these objects, the invention consists broadly of a means or mechanism to cut the bean vine, of a mechanism for winding vines into separate bundles, and of a mechanism for ejecting these bundles on to the ground. There are provided other mechanisms and combinations necessary for the operation of the mechanisms named; and for carrying the bean vines from the harvesting mechanism to the winding mechanism. These will be better understood from the following specification and the accompanying drawings, in which:

Figure 1 is a plan view of our improved harvester. Fig. 2 is a side elevation of the same. Fig. 3 is an enlarged plan view of a portion of the mechanism designated *a* in Fig. 1. Fig. 4 is a cross section taken on line 4—4 of Fig. 3. Fig. 5 is a cross section taken on line 5—5 of Fig. 3. Fig. 6 is a cross section taken on line 6—6 of Fig. 3. Fig. 7 is a cross section taken on line 7—7 of Fig. 1. Fig. 8 is a section taken on line 8—8 of Fig. 1 and enlarged. Fig. 9 is a section taken on line 9—9 of Fig. 8. Fig. 10 is a segmental plan taken on line 10—10 of Fig. 9. Fig. 11 is an elevation with parts in section taken as indicated by line 11—11 on Fig. 9. Fig. 12 is an end view of the mechanism shown in Fig. 11 and taken as indicated by the arrow numbered 12 in Fig. 11. Fig. 13 is a section taken as indicated by line 13—13 of Fig. 2. Fig. 14 is a plan view of a modified form of mechanism, showing a modified form of arrangement of the different elements.

In the drawings 20 designates a main frame supported by two forward wheels 21 and by a trailing wheel 22. Forward wheels 21 may be provided with traction ribs on their peripheries so as to afford sufficient traction that a drive for the mechanism of the harvester may be obtained from the shaft 23 upon which the wheels are mounted. Frame 20 is preferably of a generally triangular configuration and upon it all of the mechanisms are directly or indirectly mounted. A draft tongue 24 secured to the frame in any ordinary manner provides means for horses pulling the machine, and a seat 25, shown only in Fig. 1, is provided for the driver.

Extending over one of wheels 21 is a U-shaped frame 26 provided with a pivot joint 27 on its outer end, to which pivot joint is pivoted a standard 28 upon whose lower end is mounted one of runners 29. Another runner 29 is spaced a suitable distance from the first mentioned runner, the space being sufficient to straddle two adjacent rows of beans, and the runners are held in their spaced relation by an arch 30 which is high enough to pass over the rows of beans. Runners 29 are so hung from the main frame that their lower surfaces will run beneath the normal surface of the soil by a few inches, the lower surfaces being below the lower periphery point of wheels 21. Mounted between runners 29 is a rearwardly extending V-shaped knife 35 and directly above this cutting knife are guide rods 36 which serve to guide the upper, or foliage, portion of the bean vines to a central position and on to the conveying mechanism mounted directly behind the cutter. Pivotal connection 27 is provided so that the runners and cutter may be thrown upwardly and out of contact with the ground when the machine is moved from place to place on the road or in a field when it is not desired to cut down the bean vines. When the cutter is in the position shown and the machine is moved over a row or rows of beans, the beans will be forced in centrally to the V-shaped end of the cutter and will be cut off just beneath the surface of the soil, the cutter normally passing along an inch or so beneath the surface. The vines when cut fall over rearwardly into a conveying mechanism which is composed of a pair of belts 40 placed one above the other and converging upwardly and rearwardly, these belts passing over rollers 41 in somewhat the manner indicated. The conveyer is driven by chain connections 42 and 43 connecting with a counter shaft 44 and with main axle 23 of the machine. Connections 42 are so arranged as to drive the conveyer belts in the correct direction to pass the vines up between the conveyer and between converging side boards 40ᵃ into a rearwardly and downwardly curved chute 45 which leads to winding box 46. Converging side boards 40ᵃ are provided with springs 47 which press them inwardly and allow them to be moved outwardly should the space between them become clogged. Located in the lower end of chute 45 and immediately above its point of discharge to winding box 46 is a horizontally traveling cutting knife 50 shown in Figs. 8 and 9 which travels across the lower end of the chute, cutting off the vines at suitable intervals as will be hereinafter explained.

Winding box 46 is located on a sub-frame 51 which extends from main frame 20 and immediately behind the conveying mechanism and the cutting mechanism. This box 46 has an entirely open upper end and side toward main frame 20; and its bottom is composed of slats 55 with spaces between them. These spaces are normally filled by strips 56 which project from a shaft 57 in opposite directions, so that a half revolution of the shaft will turn one set of strips upwardly in the direction indicated in Fig. 9 and turn the other set of strips into position to fill the slots in the bottom of the box. Another set of strips 58 projects on opposite sides of shaft 57, the strip 58 which projects outwardly at any time forming a sort of front for the box to prevent the vines from falling out while they are being operated upon. Shaft 57 is intermediately rotated through a half revolution by means of ratchet mechanism 60 shown more or less in detail in Figs. 9, 11 and 12. A cam 61 is mounted on the shaft and of the configuration best shown in Fig. 9, having two depressions in its opposite sides. A spring pressed roller 62 follows the periphery of the cam and tends to hold it in the position shown in Fig. 9. Ratchet wheel 63 is provided with two ratchet teeth 64 and a pawl 65 is adapted to engage with these teeth. Pawl 65 is mounted on an arm 66 which is loosely pivoted on shaft 57 and the arm is oscillated through the medium of a connecting rod 67 which moves in the direction indicated. Connecting rod 67 connects with an arm 68 (see Figs. 1 and 12) which is mounted on an oscillating shaft 69 mounted in bearings 70 on the main frame of the machine. Oscillating shaft 69 extends forwardly and has a follower 71 on its forward end which engages with a cam 72, being kept in such engagement by a spring 69ᵃ. Cam 72 is mounted on a sleeve 73 which is loosely mounted on axle 23 and is rotatively connected to the axle through the medium of a pair of clutch disks 74, one of the disks being provided with a series of apertures 75 (see Fig. 6) and the other disk having a pin 76 adapted to enter any one of the apertures and to drive disk 74 and the sleeve 73 and the connected cam; the disk 74 provided with pin 76 being rotatively connected to axle 23. Disk 74 with pin 76 is moved into and out of engagement with the other disk 74 through the medium of a yoke 77 and any convenient handle connection.

Cam 72 is provided with a cam face 78 which acts against the follower 71 and raises it, oscillating shaft 69 in the direction indicated. This moves connecting rod 67 in the direction indicated and oscillates arm 66 and pawl 65 indicated, throwing ratchet wheel 63 and shaft 57 around through a portion of a revolution. The ratchet action moves the shaft through less than a half revolution; but the action of spring pressed roller 62 on cam 61 will throw the shaft through the remainder of the revolution, aided by the momentum of the shaft, and the roller 62 passing into a depression of cam 61 will cause the shaft to stop in the position indicated in Fig. 9. The rotation of the shaft and of strips 56 will cause the bundle of vines which have been placed in the box 46 to be thrown upwardly and horizontally across frame 20 of the machine and out away from the rows of beans which are being harvested. It will be seen that this action occurs normally once for every revolution of the main axle, that is, once for every revolution of wheels 21; and in the ordinary size of machine this means that the machine travels approximately ten feet over a row for every bundle of vines which is made up and thrown out of the machine. This is a fair normal distance of travel to form a normal sized bundle; but when the beans are thinly spaced along the rows it is necessary to allow the bundle gathering operation to continue for some time before the ejection occurs; and then the clutch disks 74 may be moved apart, causing the rotation of the cam 72 to cease until the clutch disks are again thrown together by the operator. Situated in opposite sides of box 46 are two disks 100 having apertures 101 therethrough, through which bean vine engaging prongs 102 are adapted to pass. Prongs 102 are mounted in another disk 103 outside of the box and back of disks 100, disks 103 being slidably mounted on shafts 104 and being connectible rotatively thereto through the medium of clutch members 103$^a$. These clutch members 103$^a$ are thrown into engagement when disks 103 are moved inwardly toward each other and when prongs 102 are projected some distance into the box and engaged with the bean vines therein. Thus, there being provision for constantly rotating shafts 104, when prongs 102 are forced inwardly into the box and through disks 100 they begin to revolve with the shafts and continue to revolve as long as they are in their inner positions. When they are moved outwardly again they cease revolving. The longitudinal movement of disks 103 is accomplished through the medium of levers 105 mounted on shafts 106, which shafts are oscillated through the medium of levers 107. The ends of levers 107 are connected to a link 108 which is in turn connected to the end of an arm 109 mounted on a shaft 110. Shaft 110 is oscillated in the direction indicated in Fig. 8 to move the disks 103 inwardly. The shaft is held in its oscillated position for a suitable length of time while the disks and prongs 102 rotate and is then oscillated back to its original and normal position. A continuation 105$^a$ of one of levers 105 connects with a connecting rod 111 which connects directly to knife 50; so that when the prongs 102 are forced inwardly the knife 50 is forced across chute 45, cutting off any bean vines which may be coming through the lower part of the chute into box 46 and preventing any more vines from passing through the chute into the box. Shaft 110 extends across the framework and is oscillated through the medium of a connecting rod 120 connecting to an arm 121 mounted on the shaft, the connecting rod 120 passing forwardly through the frame and having on its forward end a pair of cam followers 122 which engage with a cam 123 mounted on sleeve 73. Cam 123 is of the general configuration shown in Fig. 4 and rotates in counter clockwise direction. The cam is of such configuration, and is so engaged by followers 122, that during one portion of the rotation of the cam the followers are held forwardly and during another portion held rearwardly; the transition from one position to the other being accomplished during the revolution of the cam through a small arc. The shaft 110 is oscillated with the movement of the followers. Thus during a portion of the cycle of movement of the machine the shaft 110 remains in the position indicated while during another portion of the movement the shaft is oscillated to a position to force prongs 102 into the box 46. Now cams 123 and 72 are so arranged on sleeve 73 with reference to each other that the movement of prongs 102 into the winding box 46 and their movement outwardly take place just before the rotation of the false slotted bottom of the box takes place. Thus, the operation is as follows: A certain amount of bean vines is fed into the winding box through chute 45. The prongs 102 then move inwardly and are rotated by their connection with shafts 104. This tends to wind the vines up into a compact bundle. When the winding is completed the prongs are withdrawn and then the strips 56 immediately quickly rotate and throw the completed bundle out of the winding box on to the ground. At the same time that the prongs move inwardly the knife 50 moves across the chute to cut off the incoming stream of bean vines and to prevent any more vines from entering the box while the winding is taking place. Immediately the operation has been completed, a new bundle of vines is forced into the box and the next operation begins.

The provision for rotating shafts 104 is shown in Figs. 1 and 8. Shaft 44, before referred to, has bevel gears 145 which rotate one of shafts 104, the forward one. It also is provided with a bevel gear 150 which meshes with a gear 151 on a counter shaft 152 extending longitudinally of the machine outside of box 46, another set of bevel gears 153 serving to drive a short shaft and another set of bevel gears 154 driving the other shaft 104.

We have also provided a tamper device which has the effect of packing the bean vines closely in chute 45 as they are passed to the winding box. This is comprised in a tamp 170 which is connected with an oscillating lever 171 pivotally mounted at 172 on the back side of box 46. The other end of the lever is connected to an eccentric 173 which is mounted on shaft 152, the effect being to reciprocate the tamp 170 to pack the bean vines more closely as they pass through the chute.

In Fig. 14 we have shown the outline of a modified form of arrangement, in which the whole device is arranged on a single center line instead of arranging the pulling power, the horses in this case, on one line and the harvesting machinery on another line. In this case the winding box discharges directly rearwardly instead of to one side. The mechanism in general may be the same as before described.

Having described our invention, we claim:

1. In combination, a box, rotating disks on opposite faces of the box, and vine engaging means projecting from the disks into the box.

2. In combination, a box having a movable bottom, rotating disks on opposite faces of the box, vine engaging prongs projecting from the disks into the box, and means for intermittently moving the bottom of the box.

3. In combination, a box, means for feeding vines into the box, a winding means within the box and comprising a series of prongs projecting from opposite faces of the box, and means to rotate the prongs about a common center, and means to eject the vines from the box.

4. In combination, a box having a slotted bottom, a false bottom for the box composed of strips adapted normally to rest in the bottom slots, means to intermittently rotate the strips about an axis situated at their ends and at right angles to their length, a disk set in each of two opposite sides of the box, prongs projecting from the disks into the box, and means to rotate the disks.

5. In combination, a box with a bottom having parallel slots therein, the top and one side of the box being open, a chute leading to the upper portion of the box and adapted to convey vines thereto, a vine cutting knife operating across the chute, a shaft arranged across the lower edge of the open side of the box, a series of spaced strips radiating from the shaft on opposite sides in a common plane, the strips on one side of the shaft normally occupying the slots in the box bottom, means to intermittently rotate the shaft through a half rotation, disks arranged in opposite sides of the box, means to rotate the disks, a series of prongs projecting through the disks and adapted to revolve therewith, and means for moving the prongs longitudinally into and out of the box through the disks.

6. In combination, a bundling and ejecting mechanism comprising a box, movable bottom therefor, rotary vine engaging members in the box, and coöperating means for actuating the vine engaging members and the box bottom.

7. In combination, a bundling and ejecting mechanism comprising a box, a movable bottom therefor, rotary vine engaging members movable into and out of the box, and coöperating means to move the said bottom and to move the rotary members into and out of the box.

8. In combination, a bundling and ejecting mechanism comprising a box, a movable bottom therefor, a chute leading thereto, a cutter operable across said chute, movable vine engaging members within the box, and coöperating means for actuating the cutter, the movable bottom and the vine engaging members.

9. In combination, a bundling and ejecting mechanism comprising a box, a chute leading thereto, a cutter operable across the chute, a rotary vine engaging means movable into the box, and an ejector mechanism adapted to eject vines from the box.

10. In combination, a bundling mechanism comprising a box, vine engaging members at opposite sides thereof, means to move the vine engaging members into the box, and means to rotate the vine engaging members.

In witness that we claim the foregoing we have hereunto subscribed our names this 5th day of August, 1911.

CHARLES R. KELLER.
OTTO O. KELLER.

Witnesses:
H. P. SPEER,
L. C. GISLER.